Figure 4:
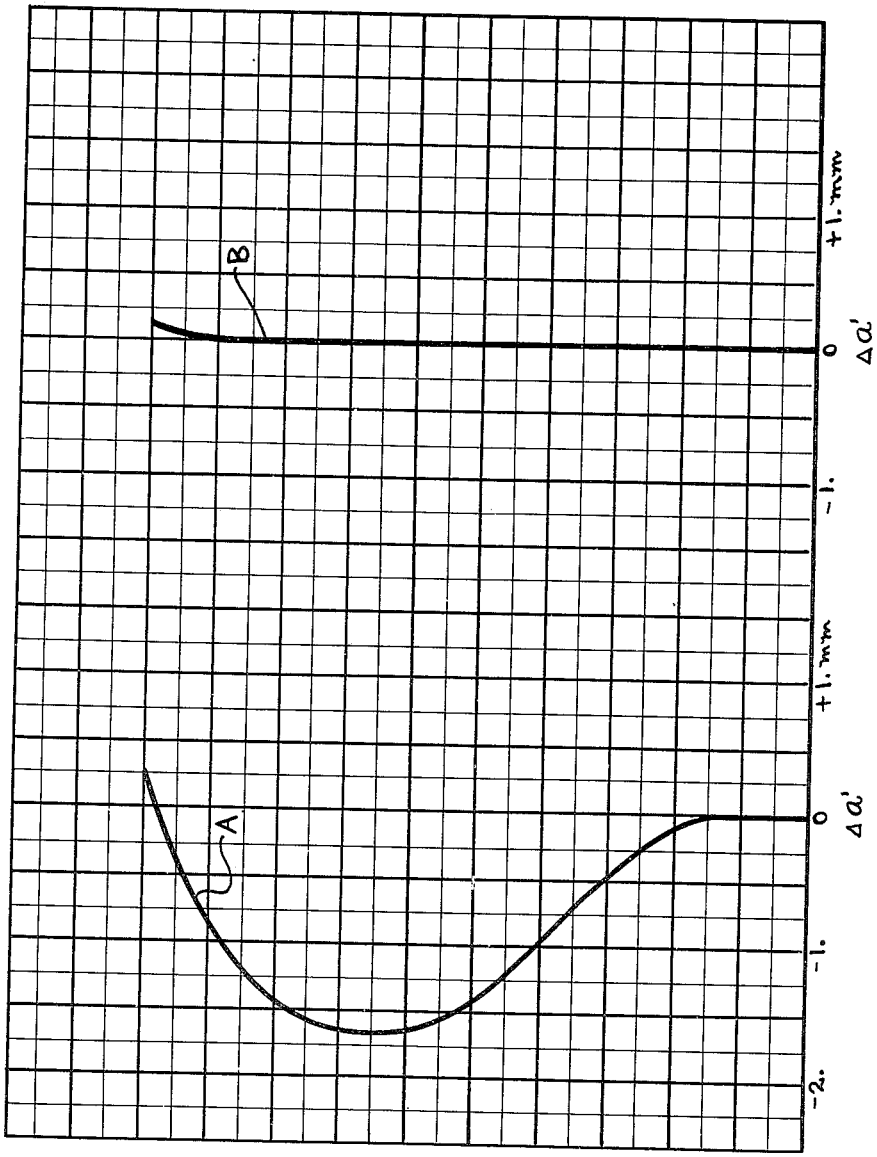
Figure 3A:
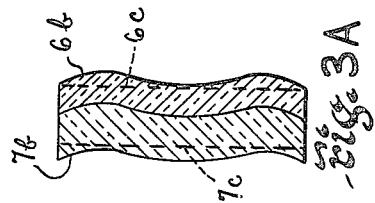
Figure 5:
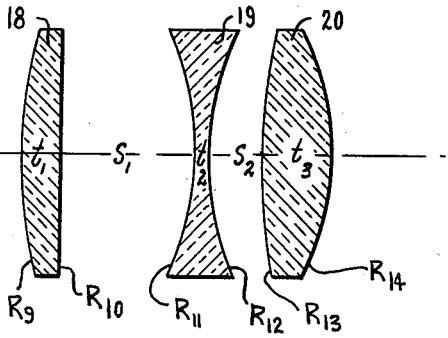
Figure 6:
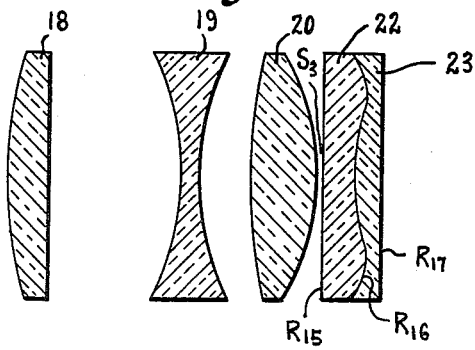
Figure 7:
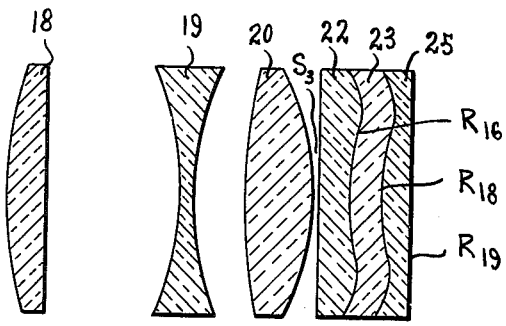
Figure 8:
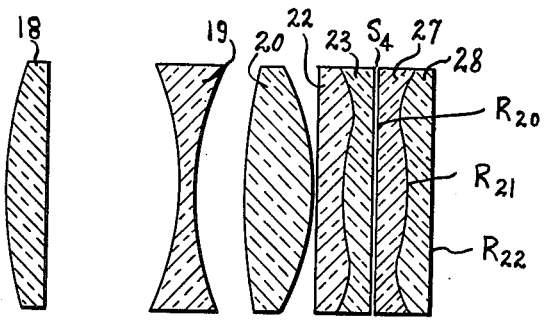

Aug. 10, 1954  E. D. TILLYER ET AL  2,685,821
METHOD OF PRODUCING LIGHT REFRACTING OPTICAL ELEMENTS
HAVING ASPHERICALLY CURVED OPTICAL INTERFACES
Original Filed June 27, 1947  6 Sheets-Sheet 1

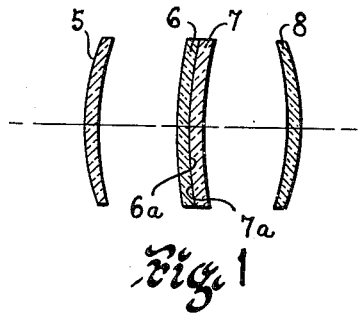

Fig. 1

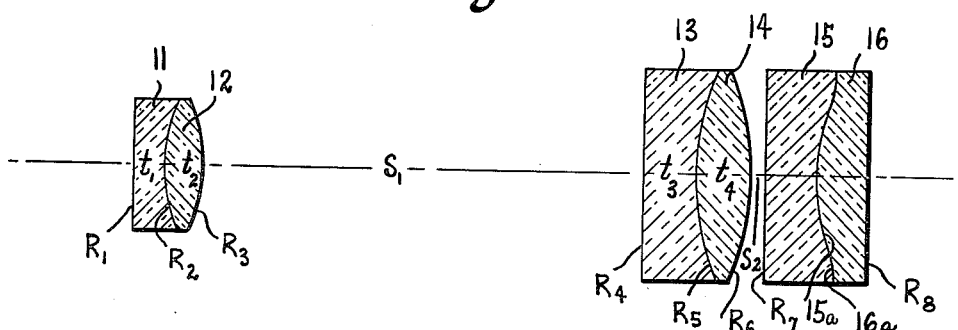

| NA = 0.25 | | | | |
|---|---|---|---|---|
| LENS | $N_D$ | $\nu$ | RADII | SPACINGS |
| 11 | 1.617 | 38.5 | $R_1 = +783$ | $t_1 = 1.32$ |
| 12 | 1.5125 | 60.5 | $R_2 = +5.32$ | $t_2 = 1.52$ |
| 13 | 1.617 | 38.5 | $R_3 = -5.32$ | $S_1 = 17.01$ |
| 14 | 1.5125 | 60.5 | $R_4 = +1638$ | $t_3 = 2.18$ |
| 15 | 1.5795 | 41 | $R_5 = +10.90$ | $t_4 = 2.03$ |
| 16 | 1.57241 | 57.4 | $R_6 = -11.75$ | $S_2 = 0.50$ |
| | | | $R_7 = \infty$ | |
| | | | $R_8 = \infty$ | |

ASPHERIC SURFACE

| $X = -0.00\,000\,121\,475\,Y^2 + 0.000\,734\,423\,Y^4 - 0.000\,032\,546\,Y^6$ | | | | | | |
|---|---|---|---|---|---|---|
| Y | 1.0 | 2.0 | 2.5 | 3.0 | 3.5 | 4.0 | 4.5 |
| X | +0.00070 | +0.00966 | +0.02073 | +0.03575 | +0.05036 | +0.05469 | +0.03088 |

Fig. 2

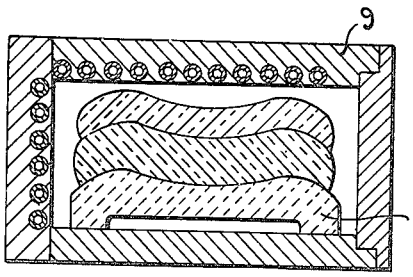

Fig. 3

INVENTORS
EDGAR D. TILLYER
ALVA H. BENNETT
BY
ATTORNEYS

INVENTORS
EDGAR D. TILLYER
ALVA H. BENNETT
BY
ATTORNEYS

| LENS | $N_D$ | $\nu$ | RADII | SPACINGS |
|---|---|---|---|---|
| 18 | 1.5163 | 64.4 | $R_9 = + 160.6$<br>$R_{10} = - 1374.8$ | $t_1 = 15.85$<br>$S_1 = 52.7$ |
| 19 | 1.5761 | 41.4 | $R_{11} = - 107.1$<br>$R_{12} = + 1234$ | $t_2 = 6.75$<br>$S_2 = 19.9$ |
| 20 | 1.5161 | 64.4 | $R_{13} = + 263.3$<br>$R_{14} = - 94.2$ | $t_3 = 25.65$ |

ASPHERIC SURFACE $\qquad S_3 = 0.5$

| $X = +0.0000010\overline{5}Y^2 + 0.00000078309Y^4 - 0.000000006256Y^6$ |||||||
|---|---|---|---|---|---|---|
| Y | 10 | 20 | 30 | 40 | 45 | 50 |
| X | +0.0073 | +.0853 | +0.1783 | -0.5578 | -1.984 | -4.881 |

GLASSES 22 $N_D$ 1.5795 $\quad \nu$ 41.0
23 $N_D$ 1.57241 $\quad \nu$ 57.4

ADDITIONAL ASPHERIC SURFACE  $S_3 = 0.5$

| $X = +0.000576677Y^2 + 0.000014878Y^4 - 0.0000000009452Y^6$ | | | | | |
|---|---|---|---|---|---|
| Y | 10 | 20 | 30 | 40 | 45 | 50 |
| X | +0.0716 | +0.4082 | +1.035 | +0.8599 | -0.5800 | -4.028 |

GLASSES:  22   $N_D$ 1.5795   $\nu$ 41.0
           23   $N_D$ 1.57241  $\nu$ 57.4
           25   $N_D$ 1.5725   $\nu$ 42.5

ASPHERIC SURFACE OF SECOND PLATE  $S_4 = 0.5$

| $X = -0.000831016Y^2 - 0.0000021152Y^4 + 0.0000000014652Y^6$ | | | | | |
|---|---|---|---|---|---|
| Y | 10 | 20 | 30 | 40 | 45 | 50 |
| X | -0.1028 | -0.5771 | -1.393 | -0.7434 | 1.810 | +7.595 |

GLASSES  27   $N_D$ 1.54141   $\nu$ 47.5
          28   $N_D$ 1.54110   $\nu$ 59.9

INVENTORS
EDGAR D. TILLYER
ALVA H. BENNETT
BY *Louis L. Gagnon*
   *Noble S. Williams*
ATTORNEYS

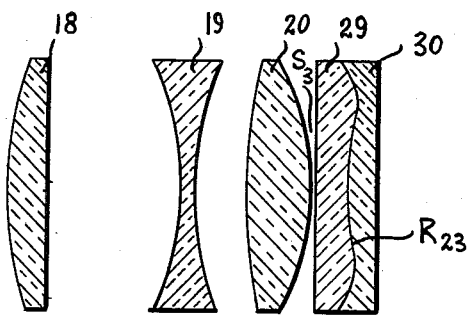
| ASPHERIC SURFACE | | | | | $S_3 = 0.5$ |
|---|---|---|---|---|---|
| $X = 0.0000001996Y^2 + 0.00000092199Y^4 - 0.000000007315Y^6$ | | | | | |
| Y | 10 | 20 | 30 | 40 | 45 | 50 |
| X | +0.0085 | +0.1006 | +0.2133 | -0.6364 | -2.294 | -5.668 |
GLASSES: 29 $N_D$ 1.617 $V$ 55.0
30 $N_D$ 1.611 $V$ 58.8
*Fig.* 9
*Fig.* 10
INVENTORS
EDGAR D. TILLYER
ALVA H. BENNETT
ATTORNEYS

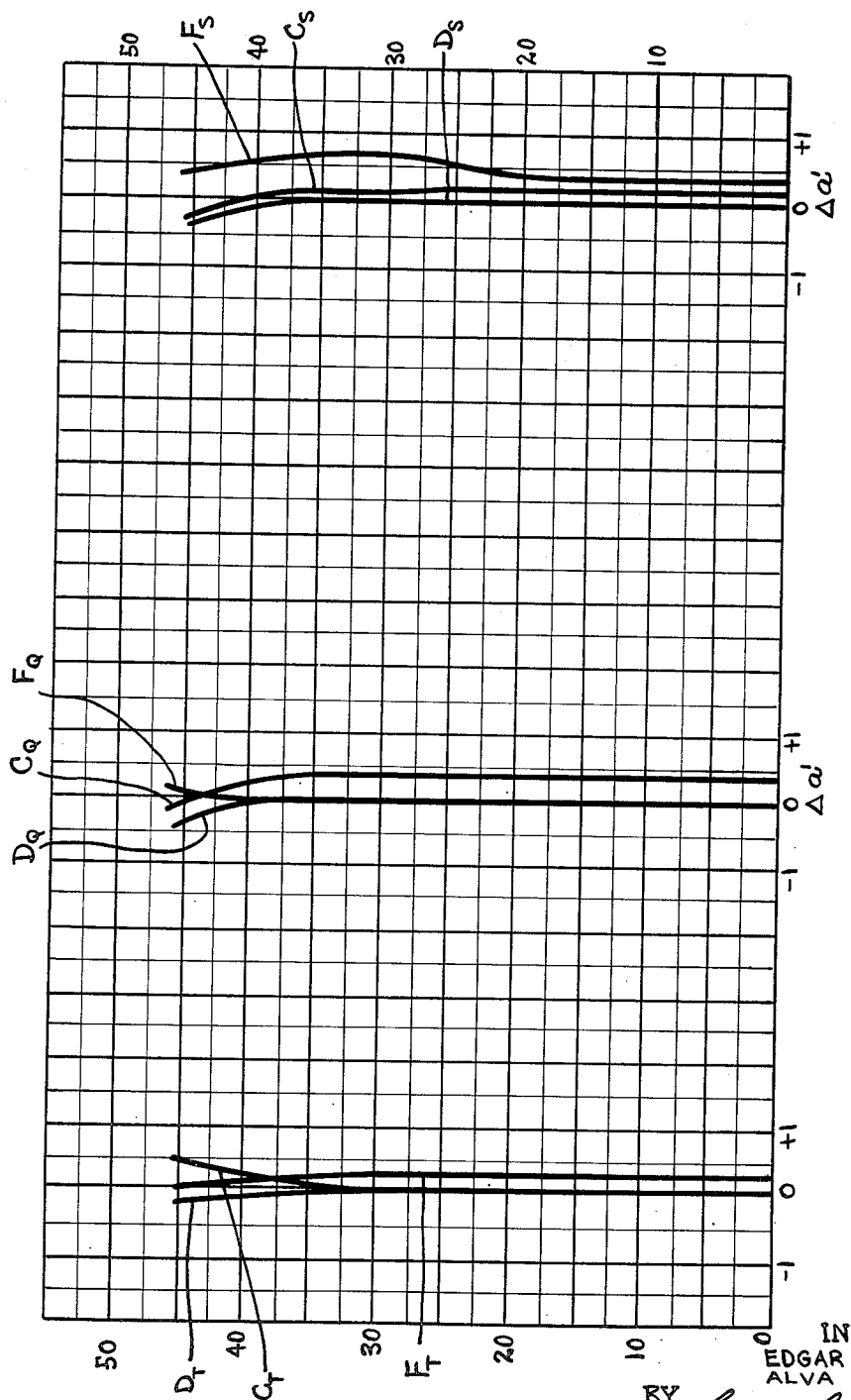

Patented Aug. 10, 1954

2,685,821

UNITED STATES PATENT OFFICE 2,685,821

METHOD OF PRODUCING LIGHT REFRACTING OPTICAL ELEMENTS HAVING ASPHERICALLY CURVED OPTICAL INTERFACES

Edgar D. Tillyer, Southbridge, Mass., and Alva H. Bennett, New Canaan, Conn., assignors to American Optical Company, Southbridge, Mass., a voluntary association of Massachusetts Original application June 27, 1947, Serial No. 757,348, now Patent No. 2,596,799, dated May 13, 1952. Divided and this application September 25, 1951, Serial No. 248,170

3 Claims. (Cl. 88—57)

The present invention relates to objectives of which typical examples are lens systems used as objectives in the photographic field for producing an image either on a film (as in a camera) or on a screen (as in a projector), and lens systems used as microscope objectives and telescope objectives. This application is a division of copending application Serial Number 757,348 which was filed June 27, 1947, and which issued May 13, 1952, as Patent No. 2,596,799.

In working out high quality objectives of this character, the designer occasionally finds a system where the field is good due to good reduction of distortion, coma, astigmatism and curvature, and good conditions of axial and lateral color, but where the system would in general be discarded because of excessive spherical aberration or excessive variation in spherical aberration with color. There are other systems whose commercial value is reduced because spherical aberration or variation in spherical aberration with color imposes a reduced aperture ratio on the system. It is an object of the present invention to overcome the defects in such systems while preserving their good field characteristics by including in the lens system an aspheric surface whose accuracy may be kept within desirable close limits by practical methods of manufacture. Such an aspheric surface, in accordance with our invention, may be on a member already a part of the system or on a member purposely added thereto.

Aspheric surfaces have been generally avoided in lens design because of the difficulties involved in obtaining accuracy in manufacture and the relative high cost of producing an aspheric surface as compared to a spherical surface which can be generated according to standard procedure. In accordance with our invention the accuracy with which the aspheric surface produced conforms to the curvature laid out by the designer is rendered substantially less critical by forming the aspheric surface internally within a member. This results in causing the change in refractive index in passing through the aspheric surface to be substantially less than in the usual design where the aspheric surface is an external surface. Further economies may be effected where this is desirable by causing a lamination of two or more layers of glass to soften under heat and sink into conformity with the predetermined curvature of an underlying surface, thereby creating the desired aspheric curvature of the interface or interfaces between the layers of glass.

In the drawings which illustrate our invention

Fig. I shows a simple camera lens system corrected in accordance with our invention;

Fig. II shows an achromatic microscope objective similarly corrected, together with its specifications;

Fig. III is a vertical sectional view through a heating chamber in which our corrector member is being shaped, the chamber being shown diagrammatically;

Fig. IIIA is a sectional view through the glass lamination after it has been dropped in the heating chamber of Fig. III and indicating the further grinding and polishing operations which are to be performed thereon;

Fig. IV is a graph illustrating the improvement in longitudinal spherical aberration brought about by the use of our corrector member in the microscope objective of Fig II;

Fig. V shows a projection objective of the Cooke triplet type together with its specifications;

Fig. VI shows the same projection objective provided with a corrector plate in accordance with our invention;

Fig. VII shows the same projection objective with a triplet corrector plate;

Fig. VIII shows the same projection objective with two doublet corrector plates;

Fig. IX shows the same projection objective with a still further corrector plate embodying our invention;

Fig. X is a graph comparing the spherical aberration occurring in the objective systems shown in Figs. V and VI; and Fig. XI is a graph showing the aberration occurring in the objective systems of Figs. VII, VIII and IX respectively.

As an example of how the invention may be applied, we will first consider a simple camera lens system such as the fixed focus, hand camera objective of the double meniscus type illustrated in Fig. I. The simple system consists of the usual two lenses for power, uncorrected for color, and designated respectively 5 and 8 in the drawing. This system has very pronounced spherical aberration.

Into this system is now introduced, in accordance with our invention, a crown-flint meniscus 6, 7 of substantially no power, the meniscus 6, 7 preferably being positioned near the stop of the system. We may make the member 6, 7 in various ways. For instance, the flint element 6 may be ground with an aspheric surface 6a complemental to the surface 7a of the crown element 7, and the two elements cemented together using a cement of approximately the same refractive index as that of the crown glass, or that of the flint glass or a refractive index intermediate the two. We prefer, however, to fuse together two flat plates of glasses which lend themselves to fusing together. These two plates, united into an integral member, are dropped by means of heat on to a refractory material so that the interface assumes the desired aspherical curve; then the two outer faces of the member are ground and polished to a spherical curve or plano by the usual means. These spherical or plano curves may be such as to give the member little residual power or the member may have specially designed external surfaces so that it becomes a part of the refracting system.

The art of fusing two glasses together has been well developed in the ophthalmic lens industry in the manufacture of bifocal lenses; and therefore there are available a considerable variety of glasses which adapt themselves to fusing. For instance, glasses of the following optical constants may be obtained from glass manufacturers such as Pittsburgh Plate Glass Co. and will fuse together:

|  | $N_D$ | V |
|---|---|---|
| Crown glass | 1.523 | 58 |
| Light Barium Crown | 1.570 | 54 |
| Ordinary Flint | 1.616 | 36 |
| Barium Crown | 1.616 | 49 |
| Dense Flint | 1.700 | 30 |
| Baryta | 1.660 | 40 |

There are a variety of glasses which when properly selected in pairs will fuse together successfully.

From this it will be seen that either a considerable or a relatively slight difference in refractive indices is available, and this is true also as to reciprocal relative dispersion, each of these two values being termed in this specification an optical constant of the respective glass.

The designing of an optical system with good reduction of the various aberrations including coma is essentially the computation of optical path lengths of various rays passing through the system, the optical path length for each ray being expressed by the formula $$\sum_{1}^{n} \mu_r l_r = \text{constant to } \frac{1}{4}\lambda$$

where $\mu_r$ is index of $r$th medium
$l_r$ is length in $r$th medium
$n$ is number of elemental paths The actual computing of the optical path lengths of the various rays may be done in various known ways. One excellent way is described by Dr. A. Estelle Glancy in an article "On the theory and computation of an aspheric surface" in the Journal of the Optical Society of America, vol. 36, No. 7, July 1946, pages 416 to 423 inclusive. As the actual computation of a specific system forms no part of the present invention, the work done by Dr. Glancy in computing given lens systems is not reproduced here.

It is of interest however to use Dr. Glancy's computations to give concrete dimensions to the simple objective shown in Fig. I. Assuming the following values for the surfaces of this objective with all surfaces spherical

[$EFL_F$ = 100 mm.   Clear aperture 26 mm.   Object at 15 ft.]

| Lens | r | t | Lens | Pittsburgh Glass | F line |
|---|---|---|---|---|---|
| | Mm. | | | | |
| 5 | +32.55 | 2.55 | 5 | C-1 | 1.5292 |
| | +48.75 | 13.30 | | | |
| 6 | +90.00 | 2.00 | 6 | DF-2 | 1.6289 |
| | +88.00 | 0.00 | | | |
| 7 | +88.00 | 2.00 | 7 | C-1 | 1.5292 |
| | +86.00 | 13.30 | | | |
| 8 | −48.75 | 2.00 | 8 | C-1 | 1.5292 |
| | −32.55 | | | | | she computed a system with the interface between elements 6 and 7 aspheric, the aspherical curve being as follows:

[Aspherical curve, osculating radius, 88.00 mm.]

| Semidiameter | Excavation | Departure from the excavation for the radius 88 |
|---|---|---|
| Mm. | Mm. | Mm. |
| 0 | 0 | 0 |
| 5.154 | 0.1725 | 0.0214 |
| 7.292 | 0.3901 | 0.0875 |
| 8.931 | 0.6547 | 0.2002 |
| 10.309 | 0.9681 | 0.3619 |
| 11.518 | 1.3342 | 0.5768 |

The following tables afford a comparison of the spherical aberration present in the first system with all surfaces spherical, with the spherical aberration present in the second system with an aspheric surface:

*Spherical system*

| $(Kl/13)^2$ | Spherical aberration | Coma |
|---|---|---|
| | Mm. | Mm. |
| 0 | | |
| 1/5 | −2.584 | −0.11 |
| 2/5 | −5.177 | −0.22 |
| 3/5 | −7.783 | −0.33 |
| 4/5 | −10.407 | −0.44 |
| 5/5 | −13.050 | −0.52 |

*Aspherical system*

| $(Kl/13)^2$ | Spherical aberration | Coma |
|---|---|---|
| | Mm. | Mm. |
| 0 | | |
| 1/5 | −0.05 | −0.03 |
| 2/5 | −0.05 | +0.02 |
| 3/5 | −0.11 | +0.02 |
| 4/5 | −0.18 | +0.12 |
| 5/5 | −0.29 | +0.24 | where $Kl$ is the aperture for the particular ray, and 13 is the Kl for full semi-aperture of the lens system.

It is important to analyze these values to determine what increase in spherical aberration occurs when in actual production the aspheric surface does not accurately conform to the computed curve. The difference in refractive indices between the dense flint glass of element 6 and the crown glass 7 is 1.6289−1.5292=0.0997. If the surface actually obtained departs from the theoretic surface by 0.01 mm. the difference in optical path, which is the determining factor, is only 0.000997 mm. or about one-tenth of the error in surfacing the lens element.

That there should be such a minimizing of the effect of a deviation of the aspherical surface from the theoretical curve, has an important bearing on the cost of producing these aspherical surfaces. Assuming that the surfaces 6a and 7a are produced by grinding and polishing, the conventional design of lens system with the aspheric surface an external surface entails long and tedious work on the part of the operator to obtain the requisite accuracy of curvature. With a design of lens system according to our invention, with an internal aspheric surface for compensating for spherical aberration or for variation in spherical aberration with color, much less care and precision need be exercised in grinding and polishing the aspheric surfaces such as the surfaces 6a and 7a, particularly where a cement is used which is effectively a continuation of the lens 6 or the lens 7 because the index of refraction of the cement is approximately the same as that of the lens 6 or the lens 7 or where the index of refraction of the cement is intermediate that of the two lenses.

It is preferable, as indicated above, to produce the aspheric surfaces by fusing together two sheets of the proper glasses and then drop the laminated glass article by heating it while supported on a refractory support having surface curvatures so controlled as to produce an interface 6a, 7a of the desired contour. A heating furnace 9 for this purpose is conventionally illustrated in Fig. III, the laminated corrector member made up of two or more sheets of glass fused together being placed on a refractory support 10. It has been found that the flow or deformation of the glass (when softened by heat) is only partially in a direction to bring it into contact with the supporting refractory. To some extent there is a sidewise flow of the glass, particularly in the vicinity of high points of the supporting refractory. This causes the surface curvatures in the vicinity of these high points to be slightly flatter than the theoretical curvature. In order to improve the accuracy obtainable in the final product, the departure in contour of the interface of the corrector member (heat-softened and dropped into contact with the refractory) is determined and then the shape of the surface of the supporting refractory is altered by a compensating amount. This is accomplished by building up or reducing different portions of the curved supporting surface of the refractory by amounts sufficient to compensate for the variations experimentally determined. This may require the dropping of several different curves and several different alterings of the supporting surface of the refractory.

The nature of the refractory material itself is important. The preferred refractory must not stick to the glass during the heating and cooling operation. Moreover it should be a composition having little or no tendency to change in shape or become distorted as to supporting surface shape during the actual dropping process. A composition for producing a material having the above desirable characteristics and as disclosed in copending application of Edgar D. Tillyer, Serial No. 485,843, filed May 6, 1943, and issued September 20, 1949, as Patent No. 2,482,698, is substantially as follows:

| | | |
|---|---|---|
| Kyanite | grams | 2400 |
| Ball clay | do | 800 |
| Chrome oxide | do | 800 |
| Sodium carbonate | do | 4 |
| Sodium silicate | do | 8 |
| Triethanolamine | cc | 2 |
| Water | | 1000 |

Much difficulty has been encountered in the dropping of glass articles on refractories to produce controlled surface curvatures because during the time that the glass is soft and in a condition to change its shape the supporting refractory surface is itself distorted due to the elevated temperatures at which the dropping process is carried on. It is important, therefore, to control the composition of the refractory material so as to avoid the tendency to become distorted during the dropping process, or to shrink an additional amount with each successive use.

When the laminated corrector member has thus been molded by dropping, it will have somewhat the configuration shown in full lines in Fig. IIIA of the drawings. The exterior surfaces 6b and 7b are ground away to the desired curvatures, for instance the curvatures indicated in dash lines 6c and 7c in Fig. IIIA, and are then polished, plano being considered a curvature as the term is thus broadly used. In some instances, both exterior surfaces may have substantially no power, the corrector member being merely an addition to a lens system with the power in the other elements of such system. This is the situation in the simple camera lens system above described. In other instances, one or both exterior surfaces may be ground and polished to have power. Here the aspheric surface is, in effect, inserted within one of the lens elements of the optic system.

Since the sheets of glass have been fused, no error is introduced by adhesive interposed between the two glasses. Excellent results are obtainable, therefore, in correcting for spherical aberration and for variation in spherical aberration with color by producing an aspheric surface by a process which due to the use of a molding technique is economical and capable of producing large quantities without excessive labor cost.

The invention will now be discussed in connection with examples of more complicated lens systems which have been designed in accordance with our invention.

The achromatic microscope objective of Fig. II is of conventional design including two doublets, the first doublet being made up of the negative flint element 11 and the positive crown element 12, while the second doublet is made up of the negative flint element 13 and the positive crown element 14. Both doublets are cemented. By the use of two doublets in this manner, chromatic aberration may be substantially reduced; and the objective as illustrated has been designed to correct for color as well as for coma and astigmatism. A specification for this objective is as follows:

| Lenses | $N_D$ | V | Radii | Spacings |
|---|---|---|---|---|
| 11 | 1.617 | 38.5 | $R_1 = +\ 783$ | $t_1 = 1.32$ |
| 12 | 1.5125 | 60.5 | $R_2 = +\ 5.32$ | $t_2 = 1.52$ |
|  |  |  | $R_3 = -\ 5.32$ | $s_1 = 17.01$ |
| 13 | 1.617 | 38.5 | $R_4 = +1638.$ | $t_3 = 2.18$ |
| 14 | 1.5125 | 60.5 | $R_5 = +\ 10.90$ | $t_4 = 2.03$ |
|  |  |  | $R_6 = -\ 11.75$ | $s_2 = 0.05$ |
| 15 | 1.5795 | 41.0 | $R_7 = \infty$ |  |
| 16 | 1.57241 | 57.4 | Aspheric |  |
|  |  |  | $R_8 = \infty$ |  | wherein $R_1$ to $R_8$ are the radii of the spherical surfaces on the lens elements I to VI of the system, except as otherwise noted, the plus and minus signs refer respectively to surfaces convex and concave to the front, $t_1$ to $t_4$ are the thicknesses of the elements, $s_1$ and $s_2$ are the air space distances between adjacent elements, $N_D$ is the refractive index with respect to the D line of the spectrum, and V is the reciprocal relative dispersion of the elements. The longitudinal spherical aberration for this particular system is shown by the curve A at the left of Fig. IV. A corrector member may be added to the lens system as shown in Fig. 2 to substantially reduce this spherical aberration, two elements 15 and 16 with an interface 15a, 16a being provided for this purpose. The interface is an aspheric surface whose formula has been computed by the expansion of the aberrations into a power series, and determining the necessary aspheric surface for their correction. The resulting formula for the aspheric surface is:

$$X = -0.00000121475\ y^2 + 0.000734423\ y^4 - 0.000032546\ y^6$$

in which $y$ is the distance from the axis of the optical system and $x$ is the departure of the aspheric surface from plano.

While a light flint glass has been used for element 15 and a barium crown glass has been used for element 16, the indices have a difference of $1.5795 - 1.5724 = 0.0071$. Since as explained above it is the difference in optical path which is the determining factor in designing the aspheric surface 15a, 16a, the difference in refractive indices of only 0.0071 affords considerable tolerance in the accuracy of this aspheric surface. The particular glasses specified in this design for the elements 15 and 16 are not of the readily fusible type and therefore it is preferable to grind and polish the aspheric surfaces for the interface 15a, 16a and cement the surfaces together with an adhesive having a refractive index of approximately 1.57 to 1.58.

With a corrector plate of this design the longitudinal spherical aberration of the microscope objective of Fig. II is so nearly eliminated as to give the curve B shown in the graph at the right of Fig. IV.

In Fig. V is illustrated a typical projection objective of the Cooke triplet type. This design of objective has good field characteristics, and as is conventional in Cooke triplets comprises a positive lens 18, a second positive lens 20 spaced therefrom with a negative lens 19 interposed therebetween. The specifications of the particular triplet which we have selected as an example are set forth in Fig. V and are as follows:

| Lenses | $N_D$ | V | Radii | Spacings |
|---|---|---|---|---|
| 18 (I) | 1.5163 | 64.4 | $R_9 = +\ 160.6$ | $t_1 = 15.85$ |
|  |  |  | $R_{10} = -1374.8$ | $s_1 = 52.7$ |
| 19 (II) | 1.5761 | 41.4 | $R_{11} = -\ 107.1$ | $t_2 = 6.75$ |
|  |  |  | $R_{12} = +\ 123.4$ | $s_2 = 19.9$ |
| 20 (III) | 1.5161 | 64.4 | $R_{13} = +\ 263.3$ | $t_3 = 25.65$ |
|  |  |  | $R_{14} = -\ 94.2$ |  | wherein $R_9$ to $R_{14}$ are the radii of the spherical surfaces on the lens elements I to III of the system, the plus and minus signs refer respectively to surfaces convex and concave to the front, $t_1$ to $t_3$ are the thicknesses of the elements, $s_1$ and $s_2$ are the air space distances between adjacent elements, $N_D$ is the refractive index with respect to the D line of the spectrum, and V is the reciprocal relative dispersion of the elements.

Figs. VI, VII, VIII and IX show various designs embodying one or more corrector plates for reducing the spherical aberration of the system and the variation in spherical aberration with color. The corrector plate shown in Fig. VI is made up of two plates of glass 22 and 23 having the refractive indices respectively 1.5795 and 1.57241. The glass 22 has a reciprocal relative dispersion 41.0 and that of glass 23 is 57.4. These two glasses may be either cemented or fused together. The surfaces $R_{15}$ and $R_{17}$ are plano and the formula and the data for the aspheric surface $R_{16}$ which has been computed to reduced aberration in the objective system of Fig. V is given in Fig. VI and are as follows:

[Aspheric Surface $S_3 = 0.5$]

$$X = +0.000000105\ y^2 + 0.00000078309\ y^4 - 0.0000000006256\ y^6$$

| Y | 10 | 20 | 30 | 40 | 45 | 50 |
|---|---|---|---|---|---|---|
| X | +0.0073 | +.0853 | +0.1783 | -0.5578 | -1.984 | -4.881 | and in Fig. X is a comparison of the longitudinal spherical aberration of this objective when uncorrected and when corrected, the group of curves at the left of Fig. X showing the aberration of the objective without a corrector plate and the group of curves at the right of Fig. X showing the spherical aberration when using the corrector plate of Fig. VI. The spherical aberration for the D line of the spectrum is indicated in each of the two groups by the curve marked D and Dc, the spherical aberration for the C line of the spectrum by the curve marked C and Cc, and the spherical aberration for the F line of the spectrum by the curve marked F and Fc respectively. The difference between the two V values (see Fig. VI) which are 41 and 57.4 respectively has been purposely chosen so as to control the variation in spherical aberration with color as indicated at the right of Fig. X.

Another solution of the problem of correcting the objective of Fig. V for spherical aberration is shown in Fig. VII, a triplet corrector member being used. This triplet corrector member is made up of the doublet corrector plate of Fig. VI together with an additional internal aspheric surface $R_{18}$ afforded by an additional glass 25 having an index of refraction 1.5725 and a reciprocal relative dispersion 42.5. The rear surface $R_{19}$ is plano. The three glasses may be either cemented or fused together. The formula and the data for this additional aspheric surface are given in Fig. VII and are as follows:

[Additional Aspheric Surface $S_3 = 0.5$]

$X = +0.000576677\ y^2 + 0.0000014878\ y^4 - 0.000000009452\ y^6$

| Y | 10 | 20 | 30 | 40 | 45 | 50 |
|---|---|---|---|---|---|---|
| X | +0.0716 | +0.4082 | +1.035 | +0.8599 | −0.5800 | −4.028 |

The resultant improvement in the longitudinal spherical aberration is shown at the left of Fig. XI. Here there are three V values, namely, 41, 57.4 and 42.5. In Fig. XI where the spherical aberrations for the three specified lines of the spectrum are indicated by the letters $D_T$, $C_T$ and $F_T$ respectively, it will be noted that the choice of these three V values has resulted in a still further improvement in the control of variation in spherical aberration with color.

In Fig. VIII is illustrated still another solution of the problem of correcting the Cooke triplet of Fig. V for spherical aberration. To the doublet corrector plate of Fig. VI has been added a second doublet corrector plate made up of the glasses 27 and 28 having the refractive indices respectively 1.54141 and 1.54110 and providing front and rear plano surfaces $R_{20}$ and $R_{22}$ and aspheric interior surface $R_{21}$. The reciprocal relative dispersion of glass 27 is 47.5 and that of glass 28 is 59.9. The formula and the data for the aspheric surface of the second doublet corrector plate are given in Fig. VIII and are as follows:

[Aspheric Surface of Second Plate $S_4 = 0.5$]

$X = -0.000831016\ y^2 - 0.0000021152\ y^4 + 0.0000000014652\ y^6$

| Y | 10 | 20 | 30 | 40 | 45 | 50 |
|---|---|---|---|---|---|---|
| X | −0.1028 | −0.5771 | −1.393 | −0.7434 | 1.810 | +7.595 | and the resulting correction in the longitudinal spherical aberration is shown in the central group of curves $D_Q$, $C_Q$ and $F_Q$ of Fig. XI.

In Fig. IX is illustrated a still further solution of the problem of correcting the spherical aberration of the Cooke triplet of Fig. V. Here a doublet corrector plate is used made up of the glasses 29 and 30 having the refractive indices respectively 1.617 and 1.611. The reciprocal relative dispersion of the glass 29 is 55.0 and that of glass 30 is 58.8. The formula and the data for the aspheric surface $R_{23}$ of this corrector plate are shown in Fig. IX and are as follows:

[Aspheric Surface $S_5 = 0.5$]

$X = 0.0000001996\ y^2 + 0.00000092199\ y^4 - 0.0000006007315\ y^6$

| Y | 10 | 20 | 30 | 40 | 45 | 50 |
|---|---|---|---|---|---|---|
| X | +0.0085 | +0.1006 | +0.2133 | −0.6364 | −2.294 | −5.668 | and the resulting correction in the longitudinal spherical aberration of the triplet of Fig. V is shown by curves $D_S$, $C_S$ and $F_S$ at the right of Fig. XI.

The examples we have given in Figs. V, VI, VII and VIII all show to varying degrees a reduction in the variation in spherical aberration with color, as well as a reduction in spherical aberration. If the problem should be to correct an objective with excellent spherical aberration correction for the D line but bad variation of the spherical aberration with color, we would in accordance with our invention select a plurality of glasses having nearly the same index of refraction for the D line but with different relative dispersions to form the corrector member. An example of a pair of glasses suitable for correcting the variation in spherical aberration with color under such circumstances is Barium Crown with an index of refraction 1.616 and a V value 49 combined with ordinary flint having an index of refraction 1.616 and a V value 36.

If it is desired to change the spherical aberration alone and leave the variation of spherical aberration with color the same as before, a pair of glasses should be used having approximately the same V value but with different indices of refraction. This latter is rarely desired.

In all of the examples just discussed it will be noted that to improve an objective which has excessive aberration of one kind or the other, a selection is made of glasses having appropriate difference therebetween in an optical constant. If the objective is defective because of spherical aberration, the glasses are selected with regard to the difference in the optical constant, index of refraction. If the objective is defective because of variation in spherical aberration with color, the glasses are selected with regard to the difference in the optical constant, reciprocal relative dispersion. Generally, the selection is made with regard to both of these optical constants.

In these various embodiments of our invention the aspheric surface is a surface between glass elements attached to each other to form a unit with an internal correcting surface. Instead of a single aspheric surface a plurality of aspheric surfaces may be employed. The aspheric surface or surfaces is preferably placed at the so-called stop point. Being so positioned, the oblique and axial bundles of rays go through the same portion of the correcter member.

Our invention has wide application as it may be used to improve lens systems of various designs where the spherical aberrations or the variation in spherical aberration with color is troublesome. Since the designer is thereby enabled to bend his efforts first toward the improvement of the field of the lens system by correction of coma, astigmatism, etc., it affords him considerably greater latitude in the design of his system. The correction for spherical aberration or variation in spherical aberration or both can then be taken care of by means of our invention.

Our improvement has the further distinct advantage that the aperture ratio of the system is substantially improved by the correction made possible by our invention, thereby substantially increasing the commercial value of the optical system to which the invention has been applied.

While certain illustrative embodiments of our invention have been shown and described, it will be understood that our invention may be otherwise embodied and practiced within the scope of the following claims.

Having described our invention we claim:

1. The method of producing a light refracting optical component having an aspherically curved optical interface, for use in correcting at least one of the spherical and chromatic aberrations of a lens system otherwise well corrected for distortion, coma, astigmatism and curvature of field when said optical interface is located substantially at the stop point in said system, said method comprising fusing a plurality of substantially parallel-sided optically finished pieces of glass together in face-to-face relation so as to form a single integral laminated member having an optical interface, each of said pieces of glass having predetermined refractive and dispersive optical constants and each piece of glass differing appreciably from an adjacent piece of glass in at least one of said optical constants, forming a supporting member of refractory material of a type which may be readily altered in shape when desired by adding like refractory material thereto and by removing material therefrom, said refractory material also being of a type to which glass will not adhere and which will not alter its shape appreciably when heated to a temperature sufficient to soften for dropping purposes glasses of the types provided said laminated member, forming on the upper surface of said refractory material a contour of predetermined curvature, said predetermined curvature of said upper surface being aspherically shaped so as to closely approximate the predetermined interface curvature for said system in accordance with the spherical and chromatic aberrations of said system to be corrected, placing said laminated member upon said upper surface of said supporting member while said upper surface is maintained in a generally horizontal position, raising the temperature of said laminated member to the softening temperature of the glasses of said laminated member and maintaining said temperature only for a time sufficient to cause said laminated member to flow laterally and move downwardly into intimate contact with said upper surface of predetermined curvature, thereby causing said laminated member to give to said optical interface an aspheric curvature for use in controlling at least one of said spherical and chromatic aberrations, grinding and polishing the exposed surfaces of said laminated member at opposite sides of said optical interface to produce refractive surfaces of known shapes thereon optically aligned with said optical interface, so that the departure of the aspherical curvature of said optical interface from said predetermined aspherical curvature desired for said system may be measured, and so that the necessary compensating curvature for the upper surface of said supporting member may be determined, altering the refractory material forming the contour of said upper surface so as to compensate for said departure, and repeating said fusing, heating, grinding, polishing and altering steps until an optical component having said desired aspherically curved interface is obtained, whereby a large number of similar optical components each having the desired aspheric interface may thereafter be easily and economically produced by repeated use of said supporting member.

2. The method of producing a light refracting optical component having an aspherically curved optical interface, for use in correcting the spherical aberrations of a lens system otherwise well corrected for distortion, coma, astigmatism and curvature of field when said optical interface is located substantially at the stop point in said system, said method comprising fusing a plurality of substantially parallel-sided optically finished pieces of glass together in face-to-face relation so as to form a single integral laminated member having an optical interface, said pieces of glass having predetermined refractive indices and predetermined dispersive indices, one of said pieces of glass differing appreciably from an adjacent piece of glass in refractive indices while the dispersive indices thereof are nearly alike, forming a supporting member of refractory material of a type which may be readily altered in shape when desired by adding like refractory material thereto and by removing material therefrom, said refractory material also being of a type to which glass will not adhere and which will not alter its shape appreciably when heated to a temperature sufficient to soften for dropping purposes glasses of the types provided said laminated member, forming on the upper surface of said refractory material a contour of predetermined curvature, said predetermined curvature of said upper surface being aspherically shaped so as to closely approximate the predetermined interface curvature for said system in accordance with the spherical aberrations of said system to be corrected, placing said laminated member upon said upper surface of said supporting member while said upper surface is maintained in a generally horizontal position, raising the temperature of said laminated member to the softening temperature of the glasses of said laminated member and maintaining said temperature only for a time sufficient to cause said laminated member to flow laterally and move downwardly into intimate contact with said upper surface of predetermined curvature, thereby causing said laminated member to give to said optical interface an aspheric curvature for use in controlling spherical aberrations, grinding and polishing the exposed surfaces of said laminated member at opposite sides of said optical interface to produce refractive surfaces of known shapes thereon optically aligned with said optical interface, so that the departure of the aspherical curvature of said optical interface from said predetermined aspherical curvature desired for said system may be measured, and so that the necessary compensating curvature for the upper surface of said supporting member may be determined, altering the refractory material forming the contour of said upper surface so as to compensate for said departure, and repeating said fusing, heating, grinding, polishing and altering steps until an optical component having said desired aspherically curved interface is obtained, whereby a large number of similar optical components each having the desired aspheric interface may thereafter be easily and economically produced by repeated use of said supporting member.

3. The method of producing a light refracting optical component having an aspherically curved optical interface, for use in correcting the chromatic aberrations of a lens system otherwise well corrected for distortion, coma, astigmatism and curvature of field when said optical interface is located substantially at the stop point in said system, said method comprising fusing a plurality of substantially parallel-sided optically finished pieces of glass together in face-to-face relation so as to form a single integral laminated member having an optical interface, said pieces of glass having predetermined refractive indices and predetermined dispersive indices, one of said pieces of glass differing appreciably from an adjacent piece of glass in dispersive indices while the refractive indices thereof are nearly alike, forming a supporting member of refractory material of a type which may be readily altered in shape when desired by adding like refractory material thereto and by removing material therefrom, said refractory material also being of a type to which glass will not adhere and which will not alter its shape appreciably when heated to a temperature sufficient to soften for dropping purposes glasses of the types provided said laminated member, forming on the upper surface of said refractory material a contour of predetermined curvature, said predetermined curvature of said upper surface being aspherically shaped so as to closely approximate the predetermined interface curvature for said system in accordance with the chromatic aberrations of said system to be corrected, placing said laminated member upon said upper surface of said supporting member while said upper surface is maintained in a generally horizontal position, raising the temperature of said laminated member to the softening temperature of the glasses of said laminated member and maintaining said temperature only for a time sufficient to cause said laminated member to flow laterally and move downwardly into intimate contact with said upper surface of predetermined curvature, thereby causing said laminated member to give to said optical interface an aspheric curvature for use in controlling said chromatic arberrations, grinding and polishing the exposed surfaces of said laminated member at opposite sides of said optical interface to produce refractive surfaces of known shapes thereon optically aligned with said optical interface, so that the departure of the aspherical curvature of said optical interface from said predetermined aspherical curvature desired for said system may be measured, and so that the necessary compensating curvature for the upper surface of said supporting member may be determined, altering the refractory material forming the contour of said upper surface so as to compensate for said departure, and repeating said fusing, heating, grinding, polishing and altering steps until an optical component having said desired aspherically curved interface is obtained, whereby a large number of similar optical components each having the desired aspheric interface may thereafter be easily and economically produced by repeated use of said supporting member.

References Cited in the file of this patent

UNITED STATES PATENTS

| Number | Name | Date |
|---|---|---|
| 990,303 | Shreiner | Apr. 25, 1911 |
| 1,048,227 | Straubel | Dec. 24, 1912 |
| 1,536,828 | Drescher | May 5, 1925 |
| 1,619,341 | Gagnon | Mar. 1, 1927 |
| 1,739,743 | Ustonson | Dec. 17, 1929 |
| 1,815,992 | Sherts et al. | July 28, 1931 |
| 2,015,007 | Emerson | Sept. 17, 1935 |
| 2,332,930 | Rinia | Oct. 26, 1943 |
| 2,468,564 | Lunenburg | Apr. 26, 1949 |
| 2,479,907 | Cox | Aug. 23, 1949 |
| 2,482,698 | Tillyer | Sept. 20, 1949 |
| 2,502,543 | Warmisham | Apr. 4, 1950 |
| 2,544,413 | Bouwers | Mar. 6, 1951 |
| 2,596,799 | Tillyer et al. | May 13, 1952 |